United States Patent [19]

Moore

[11] 4,351,533

[45] Sep. 28, 1982

[54] FACE SEAL WITH ROTATABLE SEAL RING

[75] Inventor: John A. Moore, Peoria, Ill.

[73] Assignee: Caterpillar Tractor Co., Peoria, Ill.

[21] Appl. No.: 287,540

[22] PCT Filed: Jun. 5, 1981

[86] PCT. No.: PCT/US81/00766

§ 371 Date: Jun. 5, 1981

§ 102(e) Date: Jun. 5, 1981

[51] Int. Cl.³ .............................................. F16J 15/34
[52] U.S. Cl. ........................................ 277/83; 277/84;
277/92; 277/173; 308/187.1; 305/11
[58] Field of Search ............. 277/38, 65, 81 R, 82-85,
277/92, 95, 102, 173, 177; 308/36.1, 187.1,
187.2; 305/11-13

[56]  References Cited
U.S. PATENT DOCUMENTS

| 2,554,595 | 5/1951 | Smith | 277/83 X |
|---|---|---|---|
| 2,586,739 | 2/1952 | Summers | 277/83 |
| 2,727,765 | 12/1955 | Kilpatrick | 277/83 |
| 3,180,648 | 4/1963 | Kupfert | 277/92 |
| 3,499,653 | 3/1970 | Gardner | 277/83 X |
| 3,632,120 | 1/1972 | Braudt | 277/83 |
| 3,861,765 | 1/1975 | Follert et al. | 277/92 X |
| 4,266,786 | 5/1981 | Wiese | 277/83 X |

FOREIGN PATENT DOCUMENTS

| 2226796 | 6/1973 | Fed. Rep. of Germany | 277/65 |
|---|---|---|---|
| 155298 | 7/1956 | Sweden | 277/8 |

Primary Examiner—Robert S. Ward, Jr.
Attorney, Agent, or Firm—Oscar G. Pence

[57] ABSTRACT

A face seal assembly (10) having an intermediate seal ring (38) is disclosed. The intermediate seal ring (38) is disposed between a pair of opposing metal seal faces (36,37) of the seal assembly (10) so that the faces (36,37) contact opposite sealing faces (39,40) on the ring (38), instead of each other. Means (44) are provided for rotating the intermediate seal ring (38) at a speed which is proportionately less than the rotational speed between the opposing seal faces (36,37). This rotation of the intermediate ring (38) reduces the velocities of the contacting seal faces. The face seal assembly (10) is thus capable of use in higher speed applications without incurring scoring of the seal faces.

14 Claims, 2 Drawing Figures

FACE SEAL WITH ROTATABLE SEAL RING

TECHNICAL FIELD

This invention relates generally to face-type seals wherein sealing is accomplished by mating surfaces of relatively rotating seal parts of hard material and more particularly to such seals employed in high speed applications.

BACKGROUND ART

Face-type seals generally have a pair of relatively stiff primary or rotary seal rings and a pair of secondary seals or torics of elastic material. The seal rings have abutting mating faces of a hard, wear resistant metal. The torics are positioned between an adjacent seal housing and the back side of their associated seal ring. One seal housing is typically on a stationary member, for instance an axle housing, while the other seal housing is usually on a rotating member, for instance a wheel hub or the like. The elastic torics serve a dual function. Firstly, the torics provide a static seal between their associated seal ring and seal housing. Secondly, the torics provide an axial load on their respective seal rings to ensure fluid tight face-to-face contact between the primary seal rings.

U.S. Pat. No. 3,180,648, issued Apr. 27, 1965 to Kupfert et al and assigned to the assignee of this application shows a typical face-type seal.

The prior art seals perform well in applications, such as track roller or final drives of track-type vehicles, which operate at moderate speeds. In higher speed applications, such as in axles of off-highway trucks, and the like, the pressure-velocity limits of the hard materials used for the seal rings can be exceeded. This can result in the scoring of the contacting sealing faces of the seal rings which leads to leakage of the lubricant and the ultimate failure of the seal itself and the components which the seal is employed to protect.

DISCLOSURE OF THE INVENTION

In accordance with one aspect of the present invention, a face seal assembly having a pair of opposed annular sealing faces is provided with an intermediate seal ring disposed between the opposed sealing faces. Means are provided for rotating the intermediate seal ring at a speed proportionately less than the rotational speed between the opposed sealing faces.

Metal-to-metal sealing faces are subject to scoring when the pressure/velocity limit of the sealing face material is exceeded. By adding a rotating intermediate seal ring, the resulting surface velocities between the ring and each sealing face will be substantially less than the speed would be between the sealing faces themselves. Thus, the construction of the present invention enables the seal assembly to operate at much higher rotational speeds without scoring of the contacting sealing faces of such seal assembly.

BEST MODE FOR CARRYING OUT THE INVENTION

Figure 1:
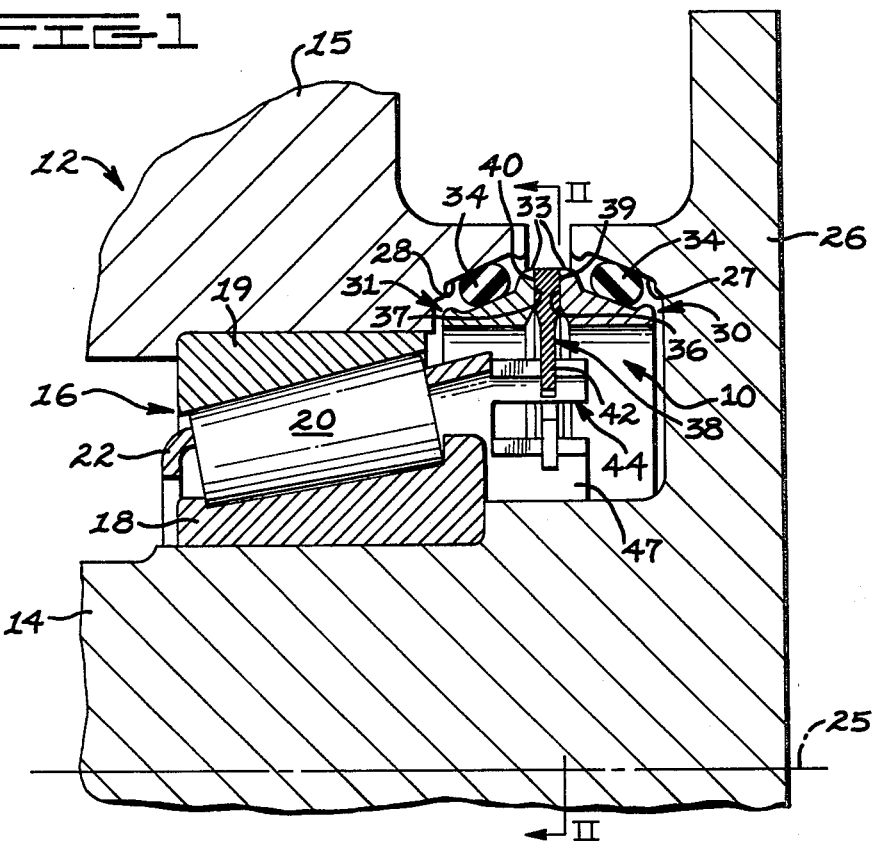
FIG. 1 is a fragmentary cross-sectional view of an apparatus illustrating an embodiment of the present invention.
Figure 2:
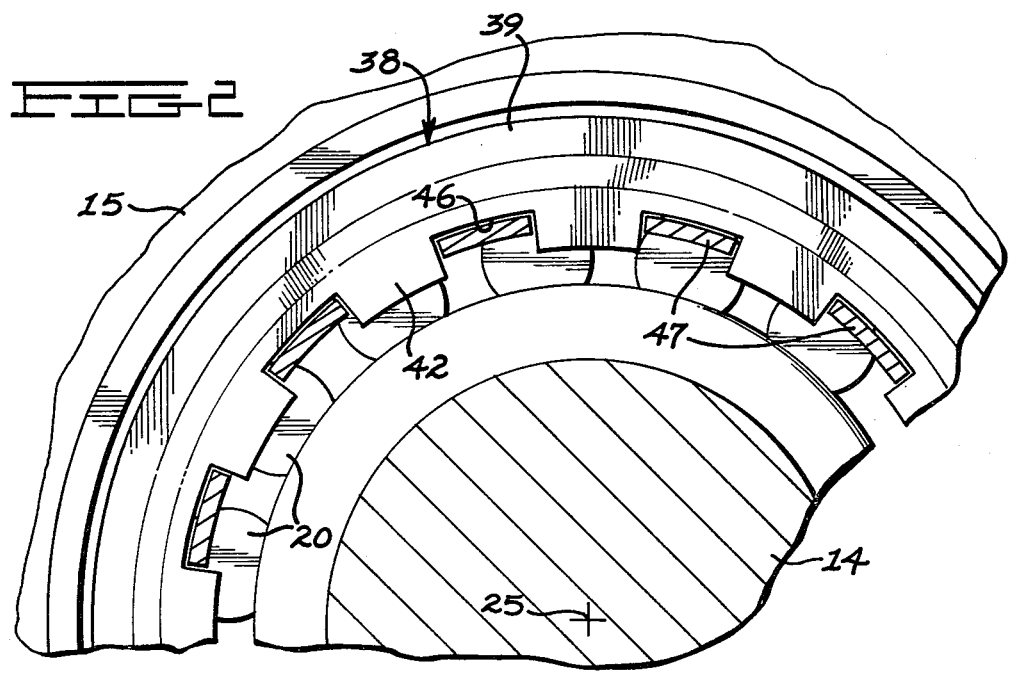
FIG. 2 is a fragmentary elevational view taken along line II—II of FIG. 1 of an intermediate seal ring constructed in accordance with the present invention.

Referring to FIG. 1 of the drawings, a face seal assembly embodying the principles of the present invention is generally indicated by numeral 10 and is associated with a rotary apparatus 12. The apparatus 12 may be any known apparatus in which a face-type seal is employed. For purposes of illustration of the present invention, the apparatus 12 includes a first or stationary member 14, such as an axle or spindle, and a second or rotating member 15, such as a wheel hub of a truck or other vehicle, not shown.

The apparatus 12 also includes a rotatable intermediary member or anti-friction bearing 16. The bearing 16 is coupled between the stationary and rotating members 14,15 in such a manner that at least a portion thereof, as will be described below, rotates at a speed which is proportionately slower than the rotational speed between the stationary and rotating members 14,15.

The bearing 16 illustrated is that of a tapered roller type having an inner race 18, an outer race 19 and a plurality of rollers 20. The rollers 20 are rollably mounted between the races 18,19, respectively, and travel in a circular orbit as one race rotates relative to the other. The bearing 16 includes a bearing cage 22 for maintaining the rollers in a spaced relationship to each other. The bearing 16 is mounted in a conventional manner with its inner race 18 being carried by the stationary member 14 and its outer race 19 being carried by the rotating member 15 and rotatably mounting the rotating member 15 about an axis 25.

It will be appreciated that other well known types of bearing assemblies, such as straight roller and ball bearing assemblies, not shown, could be used as well.

The stationary member 14 has a radially extending flange portion 26 having an annular inner cavity or seal housing 27. The rotating member 15 includes a mating annular inner cavity or seal housing 28.

The face seal assembly 10 of the present invention includes first and second seal elements 30 and 31, respectively. Each seal element 30 and 31 includes a metal seal ring 33 and means, such as an elastic load member 34, for applying an axial load to its associated seal ring 33. The seal rings 33 define a pair of opposed annular radially extending seal faces 36 and 37. The seal elements 30 and 31 are carried within their associated seal housings 27 and 28 of the stationary and rotating members 14 and 15, respectively.

In accordance with the present invention, the face seal assembly 10 is provided with a rotatable intermediate seal ring 38. All three of the seal rings 33 and 38, are preferably made of a similar hard metal alloy of any well known composite to provide high wear resistance.

The rotatable seal ring 38 has opposite sealing faces 39 and 40 which are disposed in mating contact with the respective seal faces 36,37 of their associated seal rings 33. The ring 38 includes an inner peripheral portion 42 which is disposed radially inwardly of the seal elements 30 and 31.

Means 44 are provided for rotating the intermediate seal ring 38 at a speed proportionately less than the rotational speed between the seal elements 30 and 31. The rotating means 44 preferably include means, such as mating notches 46 and projections 47, for rotatably coupling the intermediate seal ring 38 with the bearing cage 22.

A plurality of the notches 46 are preferably provided in circumferentially spaced relationship about the inner peripheral portion 42 of the ring 38. A like plurality of the circumferentially spaced projections 47 are provided on the bearing cage 22. The projections 47 extend axially into the notches 46 to provide the rotational coupling, but are of such a construction and size to allow limited free axial movement of the ring 38 along the projections 47 for maintaining the opposing sealing forces on the ring 38 in equilibrium.

INDUSTRIAL APPLICABILITY

The seal assembly 10 of the present invention has general applicability in any rotary apparatus employing a face-type seal between two relatively rotating members of such apparatus to seal in lubricating fluid and seal out foreign material. More importantly, the present seal assembly 10 is applicable to high speed applications where the effects of pressure and velocity on the relatively rotating seal faces of the prior art seal assemblies would cause the seal faces to score, resulting in seal failure and waste.

To overcome this scoring problem, the seal assembly 10 is provided with an intermediate seal ring 38. The seal ring 38 is advantageously rotated at approximately one-half the speed of the rotating member 15. Thus, the respective velocities between the sealing faces 39,40 of the intermediate seal ring 38 and their associated seal faces 36,37 of the seal elements 30 and 31 are effectively reduced to one-half the rotational speed of the rotating member 15. Accordingly, the speed of rotating member 15 can be increased up to twice that previously obtainable without incurring scoring of the sealing faces.

The one-half speed rotation of preferably accomplished by rotatably coupling the intermediate seal ring 38 to the bearing cage 22 of an anti-friction bearing 16.

The present invention utilizes an inherent feature of a bearing cage 22 to travel at approximately one-half the differential speed of the races 18,19 of a roller bearing 16 to drive the intermediate seal ring 38 of the seal assembly 10 at a similar speed.

Other aspects, objects and advantages of this invention can be obtained from a study of the drawings, the disclosure and the appended claims.

I claim:

1. A face seal assembly (10), comprising:
   a pair of opposed annular seal faces (36,37) disposed about an axis (25), one of said faces (37) being rotatable relative to the other of said seal faces (36);
   a seal ring (38) disposed between said seal faces (36,37) said seal ring (38) having opposite sealing faces (39,40) each in sealing contact with a respective one of said pair of seal faces (36,37); and
   means (44) for rotating said seal ring (38) about said axis (25) at a speed proportionately less than the rotational speed of said one seal face (37), said rotating means (44) being disposed about said axis (25) and including a portion (22) rotatable about said axis (25) at said lesser speed and means (46,47) for rotatably coupling said portion (22) to said seal ring (38).

2. The seal assembly (10) of claim 1 including a first member (14) and a second member (15) and wherein said rotating means (44) includes:
   a bearing (16) rotatably mounting said second member (15) about said first member (14), said bearing (16) having a bearing cage (22) rotatable at a speed approximately one-half the speed of said rotatable second member (15).

3. The seal assembly (10) of claim 2 wherein said bearing cage (22) includes a plurality of axially extending circumferentially spaced projections (47), and said seal ring (38) includes a like plurality of circumferentially spaced notches (46), said projections (47) extending axially into said notches (46) and said ring (38) being axially moveable along said projections (47).

4. The seal assembly (10) of claim 3 wherein said bearing (16) includes an outer race (19) carried by said second member (15), an inner race (18) carried by said first member (14) and a plurality of rollers (20) rollably carried between said inner and outer races (18,19), said bearing cage (22) being rotatably movable with said rollers (20).

5. The seal assembly (10) of claim 1 including a pair of metal seal rings (33), each seal ring (33) having one of said pair of opposed seal faces (36,37), and means (34) for applying a load to said rings (33) in an axial direction to urge the seal rings (3) toward and in rotary, fluid sealing contact with a respective one of the opposite sealing faces (39,40) of said seal ring (38).

6. In an apparatus (12) having a stationary member (14), a rotatable member (15) and a rotatable intermediary member (16), said rotating member (15) being rotatable about an axis (25) and said rotatable intermediary member (16) being coupled between said stationary and rotating members (14,15) and having a portion (22) adapted to rotate about said axis (25) at a speed proportionately less than the rotational speed of said rotating member (15), a face seal assembly (10) having a first seal element (30) carried by said stationary member (14) and a second seal element (31) carried by said rotating member (15) and in opposing relationship to said first seal element (30), wherein the improvement comprises:
   a rotatable seal ring (38) disposed between and in sealing contact with said opposing first and second seal elements (30,31); and
   means (46,47) for rotatably coupling said seal ring (38) to said portion (22) of said intermediary member (16) and for rotating said seal ring (38) at the speed of said portion (22) of said intermediary member 16, said coupling and rotating means (46,47) being rotatably disposed about said axis (25).

7. The apparatus (12) of claim 6 wherein said intermediary member (16) is a roller bearing having a plurality of rollers (20), and said portion (22) of said intermediary member (16) is a bearing cage (22) adapted to travel circumferentially with said rollers (20), said bearing cage (22) having means (47) for engaging said seal ring (38).

8. The apparatus (12) of claim 7 wherein said seal ring (38) has an inner peripheral portion (42) having a plurality of circumferentially spaced notches (46) and said engaging means (47) incudes a plurality of mating circumferentially spaced projections (47) engaging said notches (46).

9. The apparatus (12) of claim 8 wherein said bearing (16) and seal assembly (10) are disposed along a common axis (25) with said projections (47) being disposed in an axially extending direction and of a construction sufficient to be received in said notches (46), said ring (38) being axially moveable along said projections (47).

10. In an apparatus (12) having first and second members (14,15) between which relative rotation about an axis (25) occurs, a face seal assembly (10) disposed about said axis (25) and having a first seal element (30) carried by said first member (14) and a second seal element (31) carried by said second member (15) and in opposing relationship to said first seal element (30), wherein the improvement comprises:

a rotatable seal ring (38) disposed between and in sealing contact with said opposite seal elements (30,31); and means (44) for rotating said seal ring (38) about said axis (25) at a speed proportionately less than the rotational speed between said first and second members (14,15), said rotating means (44) being disposed about said axis 25 and including a portion (22) rotatable about said axis (25) and rotatably coupled to said seal ring (38).

11. The apparatus (12) of claim 10 wherein each of said first and second seal elements (30,31) includes a metal seal ring (33) and an elastic load member (34), said load member (34) being disposed between its respective seal ring (33) and the respective one of said first and second members (14,15) and adapted to apply an axial load to urge said seal rings (33) toward each other, each ring (33) having a radially extending seal face (36,37), and said rotatable seal ring (38) includes a pair of opposite sealing faces (39,40) in mating sealing contact with a respective one of the seal faces (36,37) of the seal rings (33).

12. The apparatus (12) of claim 11 wherein said rotating means (44), includes:

a roller bearing (16) disposed between said first and second members (14,15), said bearing (16) rotatably mounting said second member (15) for rotation about said first member (14), said bearing (16) having a bearing cage (22) rotatable about said first member (14) at a speed approximately one-half the speed of said second member (15); and means (46,47) for rotatably coupling said bearing cage (22) to said rotatable seal ring (38) for rotating said ring (38) at the speed of said bearing cage (22).

13. In a face seal assembly (10) for an apparatus (12) having a second member (15) rotatable relative to a first member (14) and a roller bearing (16) mounted between said members (15,14), said bearing (16) having a bearing cage (22) rotatable at approximately one-half the speed of said second member (15), said face seal assembly (10) including a pair of opposed seal rings (33), each ring (33) being carried by a respective one of said first and second members (14,15) and having an elastic load member (34) applying an axial load to said ring (33), the improvement comprising:

a rotatable seal ring (38) disposed between and in sealing contact with said pair of opposed seal rings (33), said ring (38) having an inner peripheral portion (42) adjacent said bearing cage (22); and means (46,47) for rotatably coupling said inner peripheral portion (42) of said ring (38) to said bearing cage (22) and rotating said ring (38) at the speed of said bearing cage (22).

14. The face seal assembly (10) of claim 13 wherein said coupling means (46,47) includes a plurality of circumferentially spaced projections (47) carried by and extending in an axial direction from said bearing cage (22) and a plurality of mating notches (46) provided about the inner peripheral portion (42) of said ring (38) and receiving said projections (47), said notches (46) and projections (47) being of a construction sufficient for limited free axial movement of said ring (38) relative to said bearing cage (22).

* * * * *

Disclaimer 4,351,533.—*John A. Moore*, Peoria, Ill. FACE SEAL WITH ROTATABLE SEAL RING. Patent dated Sept. 28, 1982. Disclaimer filed Feb. 10, 1984, by the assignee, *Caterpillar Tractor Co.*

Hereby enters this disclaimer to all claims of said patent.

[*Official Gazette March 27, 1984.*]